(12) United States Patent
Ahern et al.

(10) Patent No.: US 8,898,234 B2
(45) Date of Patent: Nov. 25, 2014

(54) EMAIL QUESTION OBJECT OWNERSHIP AND STATUS TRACKING

(75) Inventors: Edmond Ahern, Kinsale (IE); Oliver McCarthy, Knisale (IE); Sarah O'Connell, Rochestown (IE); Piotr Prezestrzelski, Rathcormac (IE); Thierry Supplisson, Douglas (IE)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/174,155

(22) Filed: Jun. 30, 2011

(65) Prior Publication Data

US 2013/0007144 A1 Jan. 3, 2013

(51) Int. Cl.
G06F 15/16 (2006.01)
G06Q 10/10 (2012.01)
(52) U.S. Cl.
CPC .................................. G06Q 10/107 (2013.01)
USPC ........................................ 709/204; 709/206
(58) Field of Classification Search
None
See application file for complete search history.

(56) References Cited

U.S. PATENT DOCUMENTS

| | | | | |
|---|---|---|---|---|
| 7,194,511 B2 * | 3/2007 | Stettner | | 709/205 |
| 7,437,421 B2 * | 10/2008 | Bhogal et al. | | 709/206 |
| 7,627,488 B1 * | 12/2009 | Charles | | 705/2 |
| 7,774,417 B2 * | 8/2010 | Callanan et al. | | 709/206 |
| 7,801,962 B2 * | 9/2010 | Jayaweera | | 709/207 |
| 7,809,743 B2 * | 10/2010 | Truty | | 707/758 |
| 7,882,191 B2 * | 2/2011 | Sood | | 709/206 |
| 7,953,624 B2 * | 5/2011 | Kunnes | | 705/7.32 |
| 8,095,594 B2 * | 1/2012 | Beaven et al. | | 709/204 |
| 8,171,081 B1 * | 5/2012 | Wang et al. | | 709/204 |
| 8,190,567 B2 * | 5/2012 | Dauer et al. | | 707/613 |
| 2002/0099777 A1 * | 7/2002 | Gupta et al. | | 709/206 |
| 2002/0165630 A1 * | 11/2002 | Arthur et al. | | 700/91 |
| 2004/0006598 A1 * | 1/2004 | Bargagli Damm et al. | ... | 709/206 |
| 2004/0078435 A1 * | 4/2004 | Dunbar et al. | | 709/206 |
| 2004/0141004 A1 * | 7/2004 | Cabezas et al. | | 345/751 |
| 2004/0181428 A1 * | 9/2004 | Fotsch et al. | | 705/2 |
| 2005/0033811 A1 * | 2/2005 | Bhogal et al. | | 709/206 |
| 2005/0033813 A1 * | 2/2005 | Bhogal et al. | | 709/206 |
| 2006/0195335 A1 * | 8/2006 | Christian et al. | | 705/1 |
| 2007/0288577 A1 * | 12/2007 | Kronlund et al. | | 709/206 |
| 2008/0109735 A1 | 5/2008 | Vuong | | |
| 2009/0132528 A1 * | 5/2009 | Albornoz et al. | | 707/5 |
| 2009/0132651 A1 * | 5/2009 | Roger et al. | | 709/204 |
| 2009/0132659 A1 * | 5/2009 | Facemire et al. | | 709/206 |
| 2009/0182788 A1 * | 7/2009 | Chung et al. | | 707/204 |
| 2009/0193430 A1 | 7/2009 | Chao | | |
| 2009/0216843 A1 * | 8/2009 | Willner et al. | | 709/206 |
| 2010/0057855 A1 | 3/2010 | Chakra et al. | | |
| 2010/0125474 A1 * | 5/2010 | Harmon et al. | | 705/7 |

* cited by examiner

Primary Examiner — Ninos Donabed
(74) Attorney, Agent, or Firm — Patents on Demand P.A.; Brian K. Buchheit; Scott M. Garrett (57) ABSTRACT

Enabling question object owner and status tracking can include establishing one or more question objects within an email message from a sender to a set of recipients. Question objects can be maintained on the server with unique identifiers. The question object(s) can have multiple sub question objects. Each question object or sub question object can be delegated a question owner, which can be maintained in the server. Recipients (answer providers) can take responsibility for answering various parts of the question object or the whole question object or for tackling a task associated with the question object. The server can associate and record question providers with their various responsibilities or answers. The server can then dynamically update a portion or all of the originally sent email message in the question owner's email account and the recipients' (answer providers') email accounts to show the answer and the answer provider.

16 Claims, 10 Drawing Sheets

Sender A adds clarifications 193

```
<body>
  <question id="q001">
    <text owner="sender A" mode="read only">
       Question one
    </text>
    <indication owner="recipient B" type="ownership">
    <indication owner="recipient C" type="non-ownership">
  </question>
  <question id="q002">
    <text owner="sender A" mode="read only">
       Question two
    </text>
    <indication owner="recipient B" type="non-ownership">
    <indication owner="recipient C" type="ownership">
  </question>
  <question id="q003">
    <text owner="sender A" mode="read only">
       Question three
    </text>
    <answer owner="recipient B" mode="read only">
       Answer to question 3
    </answer>
    <answer owner="recipient C" mode="read only">
       Another answer to question 3 by recipient C
    </answer>
    <clarificaion owner="sender A" mode="read only">
       Clarification for the question 3
    </clarification>
  </question>
</body>
```

Sender A closes question 3    194

```
<body>                                                              170
  <question id="q001">
    <text owner="sender A" mode="read only">
      Question one
    </text>
    <indication owner="recipient B" type="ownership">
    <indication owner="recipient C" type="non-ownership">
  </question>
  <question id="q002">
    <text owner="sender A" mode="read only">
      Question two
    </text>
    <indication owner="recipient B" type="non-ownership">
    <indication owner="recipient C" type="ownership">
  </question>
  <question id="q003">
    <text owner="sender A" mode="read only">
      Question three
    </text>
    <answer owner="recipient B" mode="read only">
      Answer to question 3
    </answer>
    <answer owner="recipient C" mode="read only">
      Another answer to question 3 by recipient C
    </answer>
    <indication owner="sender A" type="close">
  </question>
</body>
```

Sender A sends question 3 closure indication to all parties    195

Parties update their email message "status" to reflect update    196

EMAIL QUESTION OBJECT OWNERSHIP AND STATUS TRACKING

BACKGROUND

The present invention relates to the field of email communications.

Some email communications, especially in the business and academic world, include important questions in the body of an email message that are posed to one or more recipients. These questions can take the form of, for example, project status update, as well as budget, and preference inquiries, and the like. The inordinate amount of email messages that some individuals receive coupled with the lack of a tracking system in conventional email clients can often lead to questions in an email body being overlooked, forgotten about or never answered.

BRIEF SUMMARY

An embodiment of the disclosure establishes one or more questions within an email message from a sender to a set of recipients. A unique question identifier is assigned for each of the questions and a question owner is indicated for each of the questions within metadata of the email message. The email message can be conveyed to a set of recipients. An explicit answer is received to at least a portion of the questions from one of the recipients, referred to the answer provider. The answer can be associated to the question and the answer provider can be indicated within metadata of the email message. Information can be conveyed to the sender and to the recipients that shows the answer and the answer provider. The email message containing the questions can be continuously updated at computing devices of the sender and the recipients to reflect a current status of the questions. The question owner can establish when any of the questions are closed.

An embodiment of the disclosure receives at an email server an email message from a sender to a set of recipients, wherein the email message comprises a question, where metadata of the email message explicitly provides a unique identifier for the question and explicitly states a question owner. Responses to the email message are received from the recipients. Different ones of the recipients can indicate that recipient explicitly takes no responsibility for answering the question, that the recipient explicitly takes responsibility for answering the question, and that the recipient provides a response to the question. An underlying document of the email message can be updated at the sender and at each of the recipients to indicate a status of the question in accordance to the received responses.

DETAILED DESCRIPTION

Questions posed via email messages can include questions related to a project status, budget concerns, coordinating multiple people's preferences and the like. While conventional email clients can gather multiple emails regarding the same subject line in a single thread this technique or solution is subject to two conditions: the subject line has to include a string that is the exact same for every email to be correctly placed in the thread and a question asker is still required to open all threads to gather a current status of his or her question.

This is a cumbersome task and can also allow for the risk of a user accidentally overlooking crucial details. Furthermore, any feedback or additional questions regarding the provided answers will only add to the cumbersomely navigated list of emails in the thread. Attempts to solve this problem place the burden of tracking a question status on the question sender or another designated person, hindering productivity. In other words, valuable time and resources that could be otherwise allocated are spent actively tracking and/or updating the question status.

The disclosure provides a solution for tracking question object ownership and status. In one embodiment, an email client can track a status of questions in an email that was sent for resolution to a list of people. The status tracking can be based on email notifications and their seamless processing in the email clients. Users of email clients, enhanced per the disclosure, can quickly and easily view a current status of a set of questions posed in email messages and can indicate whether each question of the set has been answered (and by whom). In one embodiment, answers and additional information can be displayed in an updated body of the original email message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
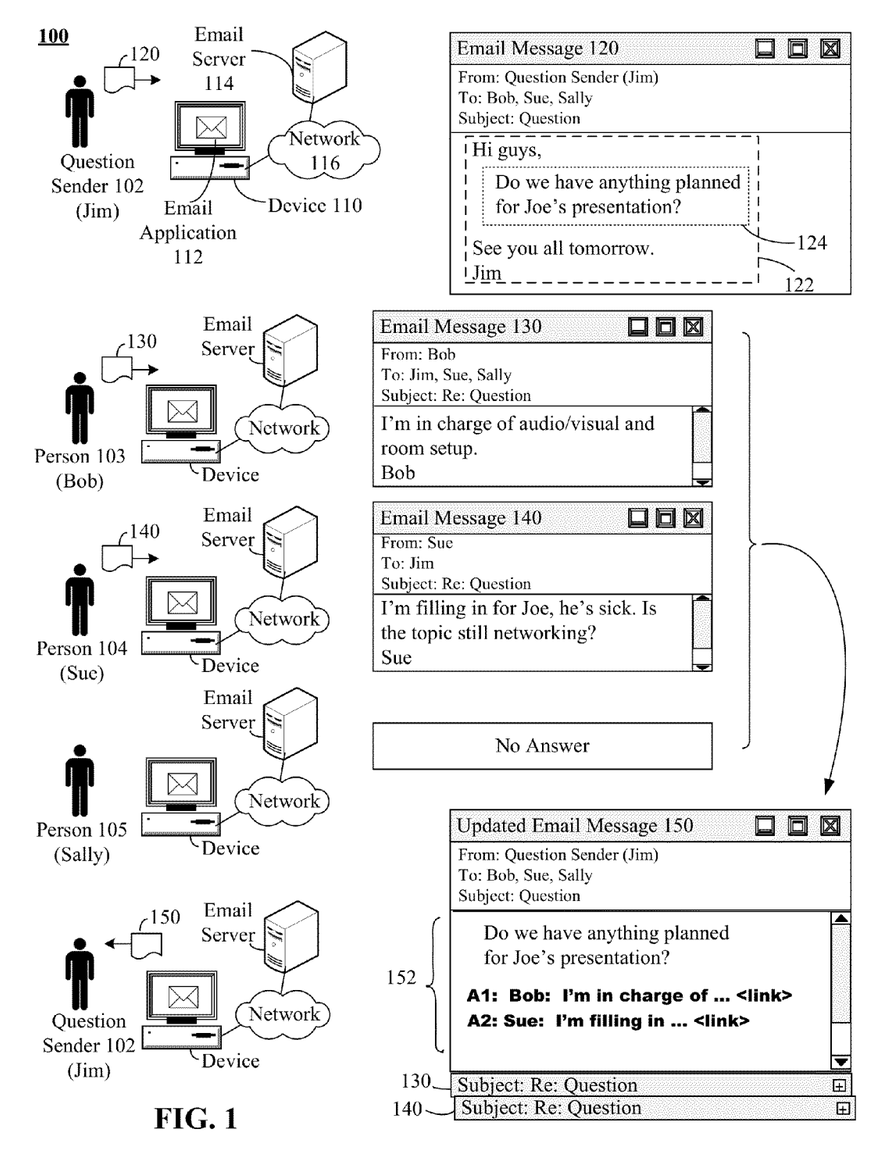
FIG. 1 is a depiction of a question status tracking scenario in accordance with embodiments of the inventive arrangements disclosed herein.

FIG. 1 is a depiction of a question status tracking scenario 100 in accordance with embodiments of the inventive arrangements disclosed herein. The tracking scenario can include a question sender 120 (Jim), and one or more recipients: person 130 (Bob), person 140 (Sue), and person 150 (Sally).

Question sender (Jim) 102 can utilize the email client 112 of device 110 to create an email message 120 containing a question 124 in the body 122 of the message. In one embodiment, the sender 102 can manually identify the question 124, such as by selecting the text of the question 124 and marking it as a logical unit (i.e., sender 102 can right-click and pick an option to consider the selected text of the body 122 as a logical unit. In one embodiment, information on the logical unit (e.g., defined question 124) can be included in the email message 120 as metadata information. This message 120 (optionally containing metadata related to the question 124) can be conveyed to a number of recipients (e.g., person 103, person 104, and person 105).

Upon receipt of original email message 120 containing a question 124, person 103 (Bob) can send a response in the form of email message 130. Similarly, person 104 (Sue) can answer (via email message 140) the question 124 posed within email message 120. A different person 105 (Sally) can receive the email message 120, yet decide not to respond. Any of the recipients of the email message 120 (person 103, 104, 105) can reply with an answer (as shown by message 1130 and 140), an indicate ownership of the question 124 (not shown), can indicate explicit non-ownership of the question 124 (not shown), or can do nothing (as shown by person 105 being non-responsive). In one embodiment, an answer or other information related to the question 124 can be included in a response (e.g., message 130, 140) as metadata information.

The original email message 120 can be updated (shown as updated email message 150) so that additional information from the answers 130, 140 is shown in an updated body 152. The additional information can show, a status of the question 124, a set of people who responded to the question 124, and whether or not recipients (person 103, 104, 105) have indicated that they will or will not respond to the question 124. In one embodiment, answers added in the updated body 152 can include a link to a more comprehensive response (e.g., email message 130 and 140, where the answer was provided, for example).

As shown, an email server 114 connected to a network 116 linking the computing devices 110 of the people 102-105 can facilitate the conveyances of the email messages 120, 130, 140. The email applications 112 use by client devices 110 and email server 114 can conform to email specific standards, such as simple mail transfer protocol (SMTP), when conveying messages 120, 130, 140 over network 116.

In one embodiment, the question handling functions detailed in scenario 100 and the disclosure can be implemented using client-side processes. That is, one embodiment of the disclosure can be implemented using a standard non-enhanced email server 114. Moreover, the email server 114 need not retain messages and/or tracking information for the disclosure to function. For example, the email applications 112 can use Post Office Protocol (POP) email accounts set up for a simple download-and delete, where the email-clients (e.g., application 112) retrieve all messages from the server 114, store them locally, delete these messages from the server 114, then disconnect from the server 114. This disclosure is not limited in this way and other protocols (Internet Message Access Protocol or IMAP) can be utilized. Further, although the disclosure can be implemented in a client-only manner (transparent to the server 114), server-assisted and/even server-based embodiments of the disclosure are also contemplated.

FIG. 1A-1E provide a use-case example of a client-side implementation for the question tracking functionality detailed herein, in accordance with an one embodiment of the disclosure. The use-case is consistent with scenario 100, where sender 102 is indicated as Sender A, and a set of recipients (persons 103-105 from scenario 100) are indicated as Receipts B and C. The use-case assumes a simple XML based implementation, but the scope of the disclosure is not to be limited in this regard.

Figure 1A:
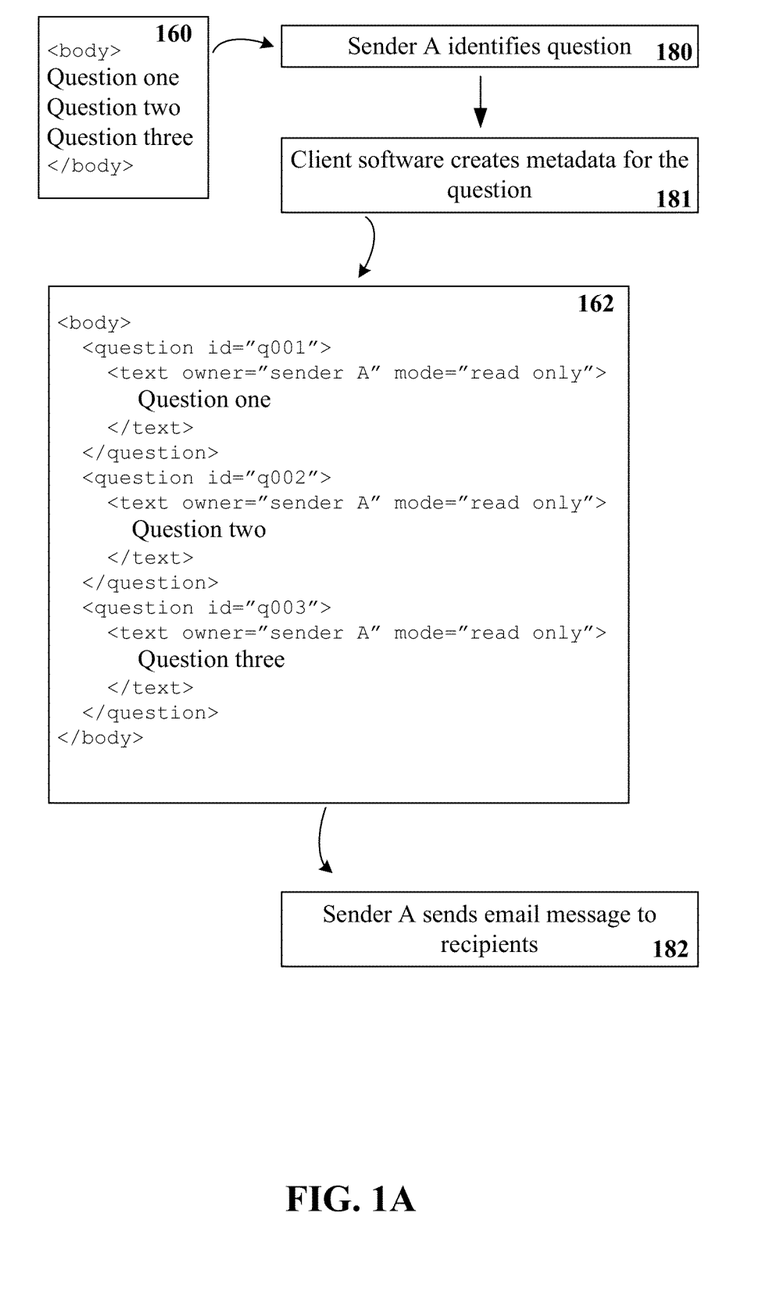
FIG. 1A-1E provide a use-case example of a client-side implementation for the question tracking functionality detailed herein, in accordance with an one embodiment of the disclosure.

In the use-case, Sender A can create an email message having three questions within the email body, which is indicated by document 160 (e.g., the "body" tag has three questions between it) of FIG. 1A. The sender (or sender's application) can identify an existence of each question within the document 160, as shown by step 180. In response, client software can create metadata for the questions, as shown by step 182. The metadata is indicated within document 162 by tags. Appreciably, email clients can be configured so that the meta info (or tags) are not displayed, but that the questions themselves are shown as separate units of text. In step 182, Sender A can send the email message (represented by document 162) to a set of recipients, which include Recipients B and C.

Figure 1B:
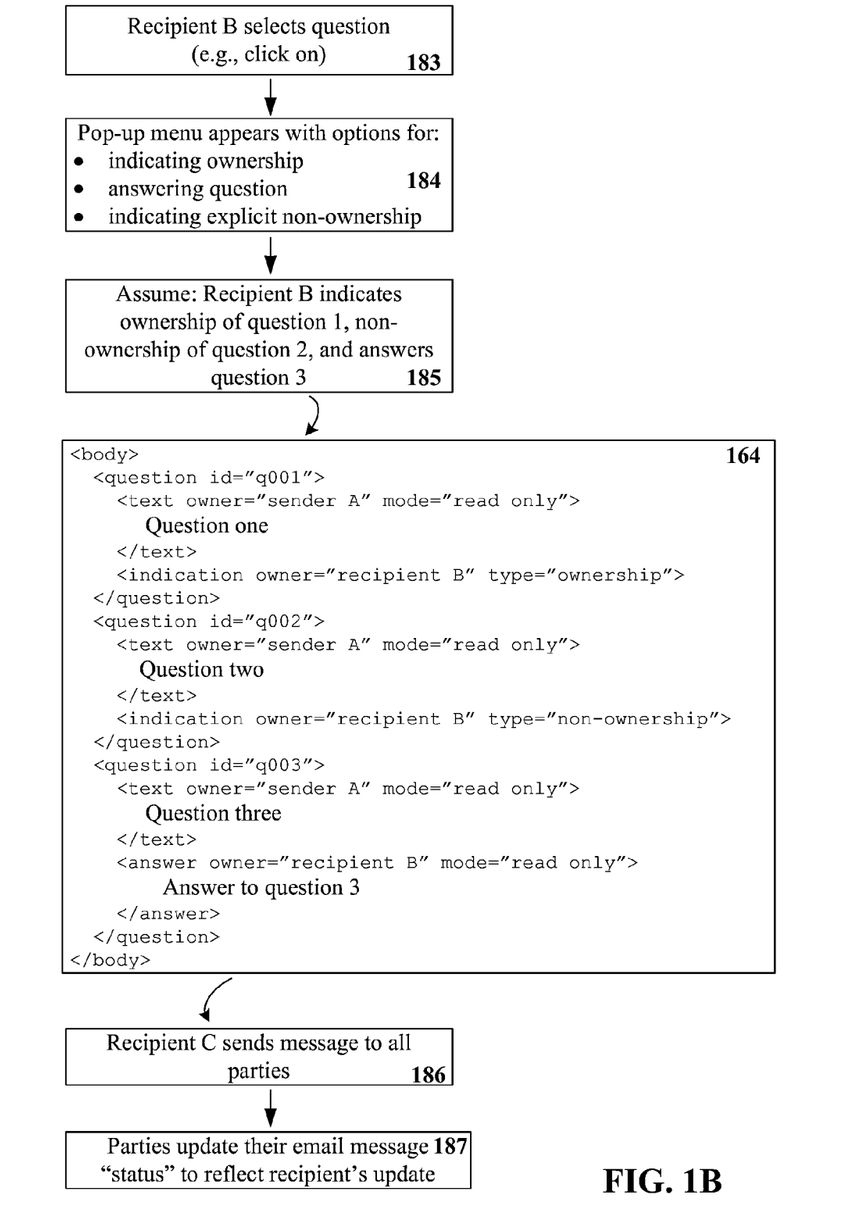

FIG. 1B shows that Recipient B receives the email message. In one embodiment, the user can select (e.g., click on) the question within the email body, as shown by step 183. A pop-up (or other interactive user-interface) can appear with options for indicating ownership of the question, for answering the question, for indicating explicit non-ownership of the question, and the like, as shown by step 184. Step 185 shows that Recipient B can (via the user interface) indicate ownership of question 1, non-ownership of question 2, and can answer question 3.

This information can be conveyed within messages (either email messages or notification messages conveyed via email). The information can be used by an email client to update the original email document, as shown by document 164. In one embodiment, the email client can simply update the original message, and send this updated message to all parties, as shown by step 186. These parties can update their email message status to reflect the recipient's update, as shown by step 187.

Figure 1C:
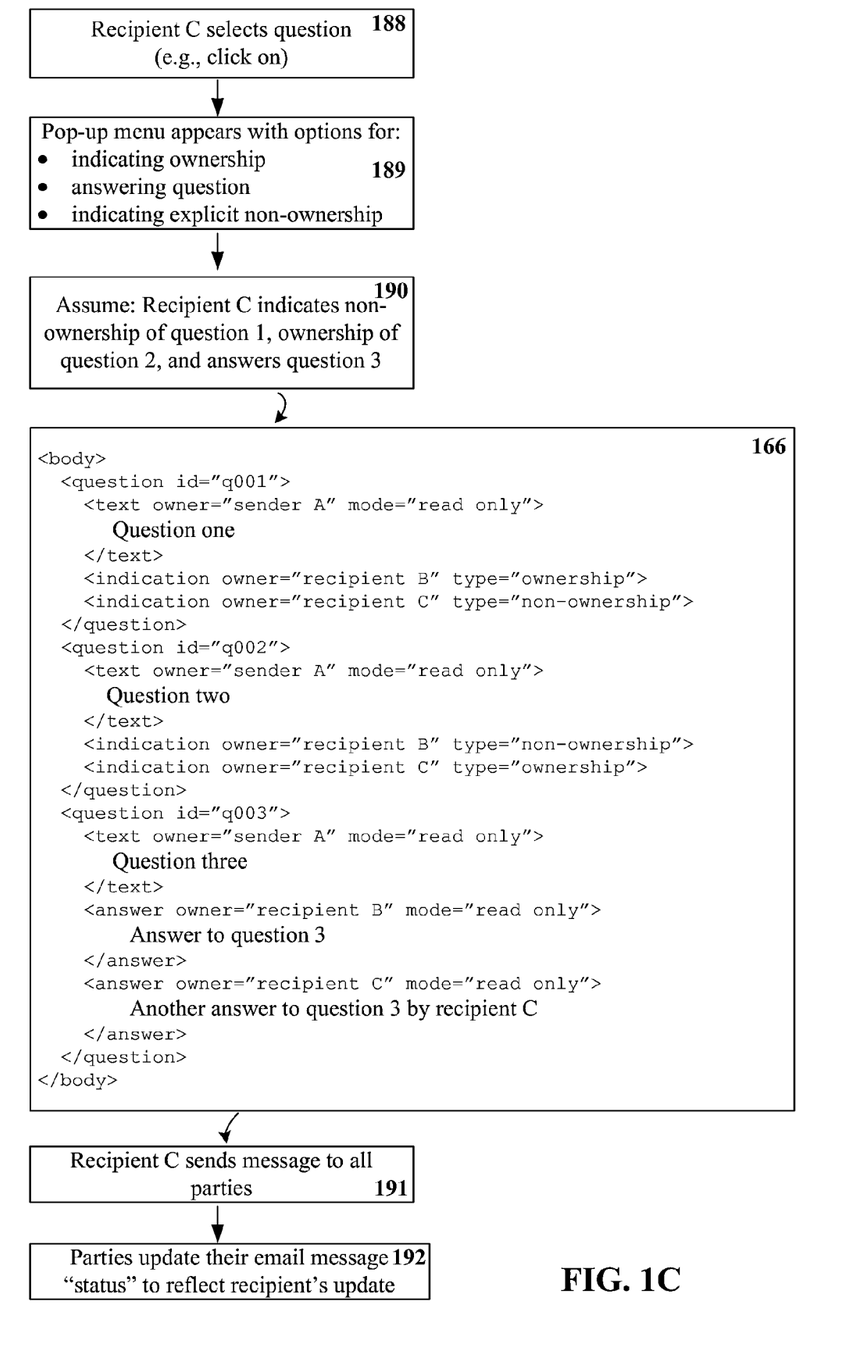

FIG. 1C shows that a Recipient C can respond to the question, after Recipient B performed their updates. The email document accessed by Recipient C can therefore include Recipient B's updates. Recipient C can select the question (shown by step 188), which causes an option set to be presented, as shown by step 189. Assume that Recipient C indicates non-ownership of question 1, ownership of question 2, and answers question 3 (shown by step 190), which causes the original email message document to be updated as shown by document 166. Recipient C can send this information to all parties (shown by step 191) that results in email clients of used by these parties updating (shown by step 192) the status of the original message (so that the related document corresponds to document 166). It should be noted that since new tags are added (to document 166), but existing tags are not removed, the existing text is read only. Thus, users see increasing amounts of updated information as additional feedback is provided by any of the recipients (can apply to 0 . . . N additional recipients, and/or 0 . . . N additional updates can be provided by Recipient B and C).

Figure 1D:
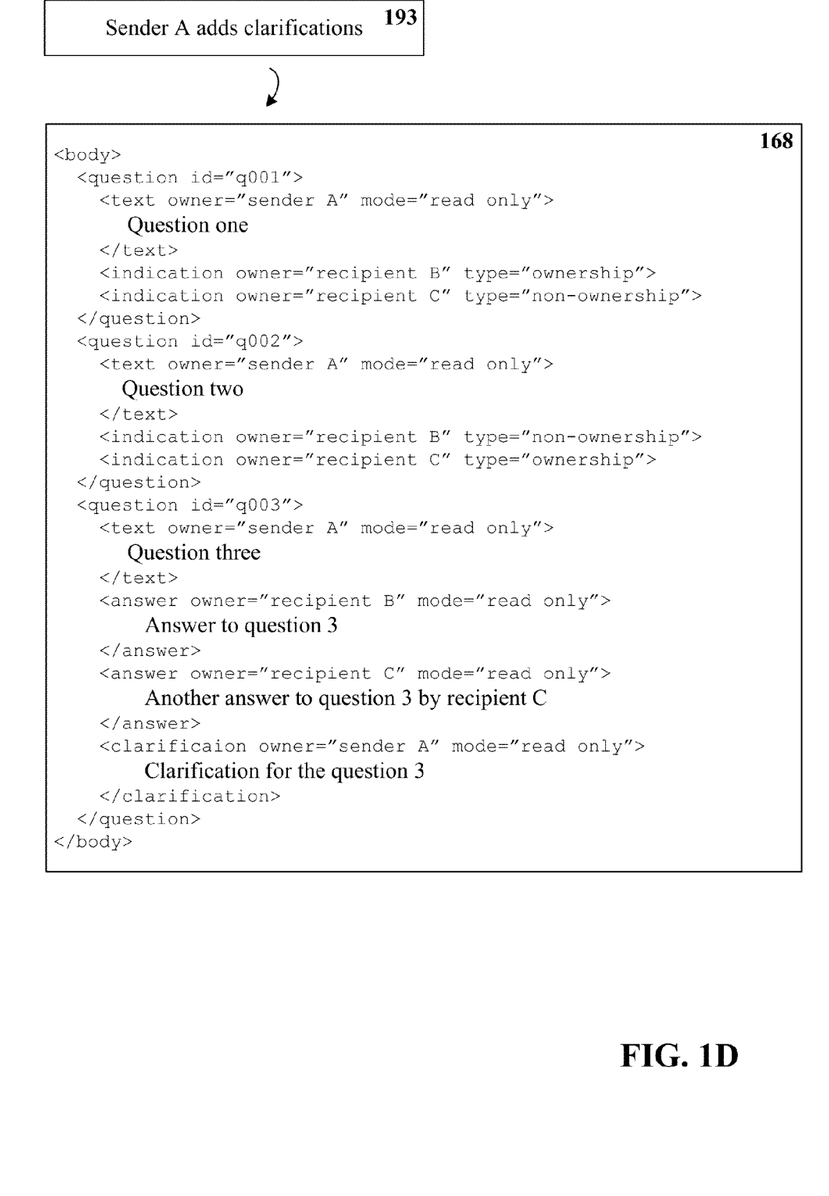

FIG. 1D shows Sender A adding clarifications 193 for the original message, after Recipient B and C have responded. This clarifications added by Sender A is shown by updated document 168. Any number of clarifications can be added by the Sender A, which are transmitted to each recipient and shown in an updated email message on that client's application interface.

Figure 1E:
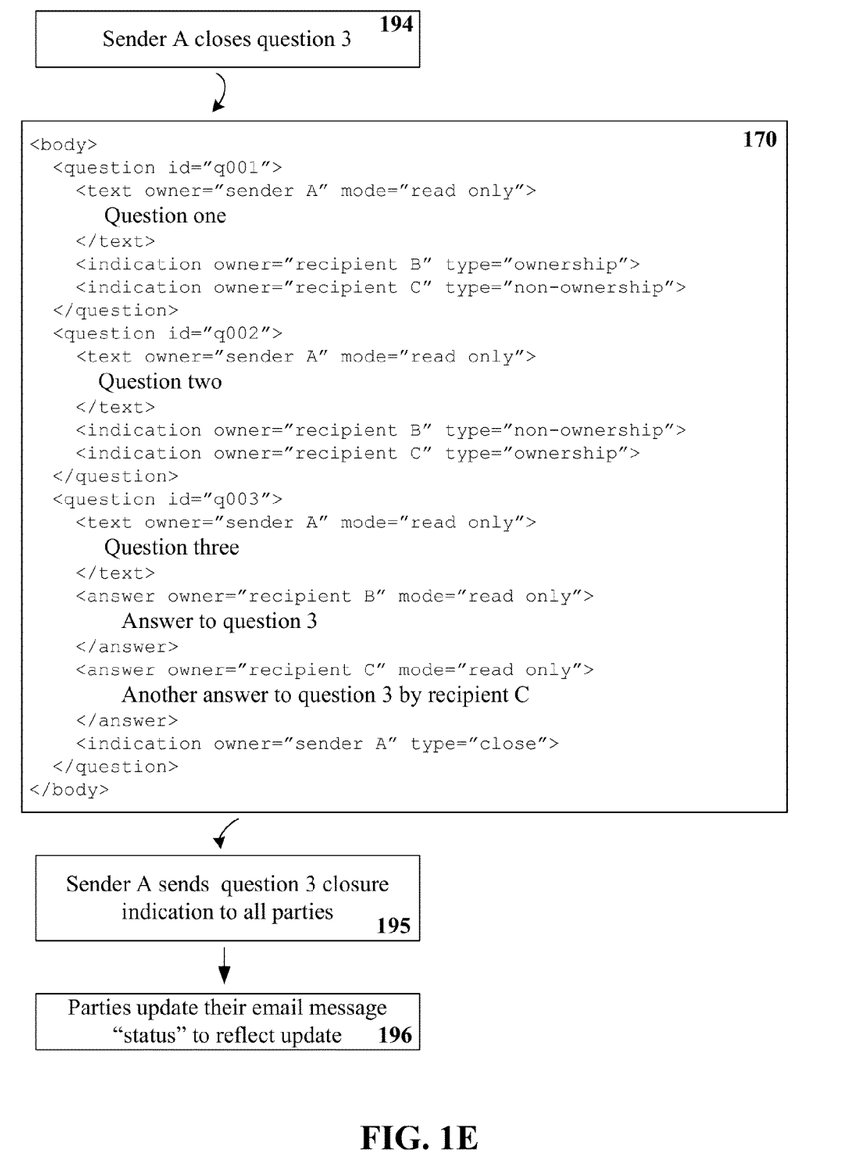

FIG. 1E shows that Sender A can close one or more questions (such as question 3 as shown by step 194). This causes an email update, as shown by document 170. That is, a question 3 closure indication can be sent to all parties (shown by step 195), which causes each client application to update the email message status (shown by step 196), so that their email message is updated accordingly (so that it corresponds to document 170, for example).

The use-case expressed by FIG. 1A-1E is an implementation of the disclosure having a distributed state management. That is, the state of the question posed by Sender A is evaluated by email client applications from the "indicated" and "answer" tags of the continuously updated email document (e.g., documents 160-170). Hence, information on recipient ownership, available answers, and explicit non-ownership is continuously updated and conveyed to the sender and/or the set of recipients. Consequently, the following state information is determined and presented to all parties by their email client applications: (i) whether the question is answered and by whom; (ii) whether the question is owned (e.g., being worked on) and by who; (iii) whether the question is not owned by any recipient—where a subset of recipients can explicitly indicate non-ownership; and, (iv) whether all recipients have explicitly indicated non-ownership and there is therefore no change of receiving an answer from a group of remaining recipients.

Figure 2:
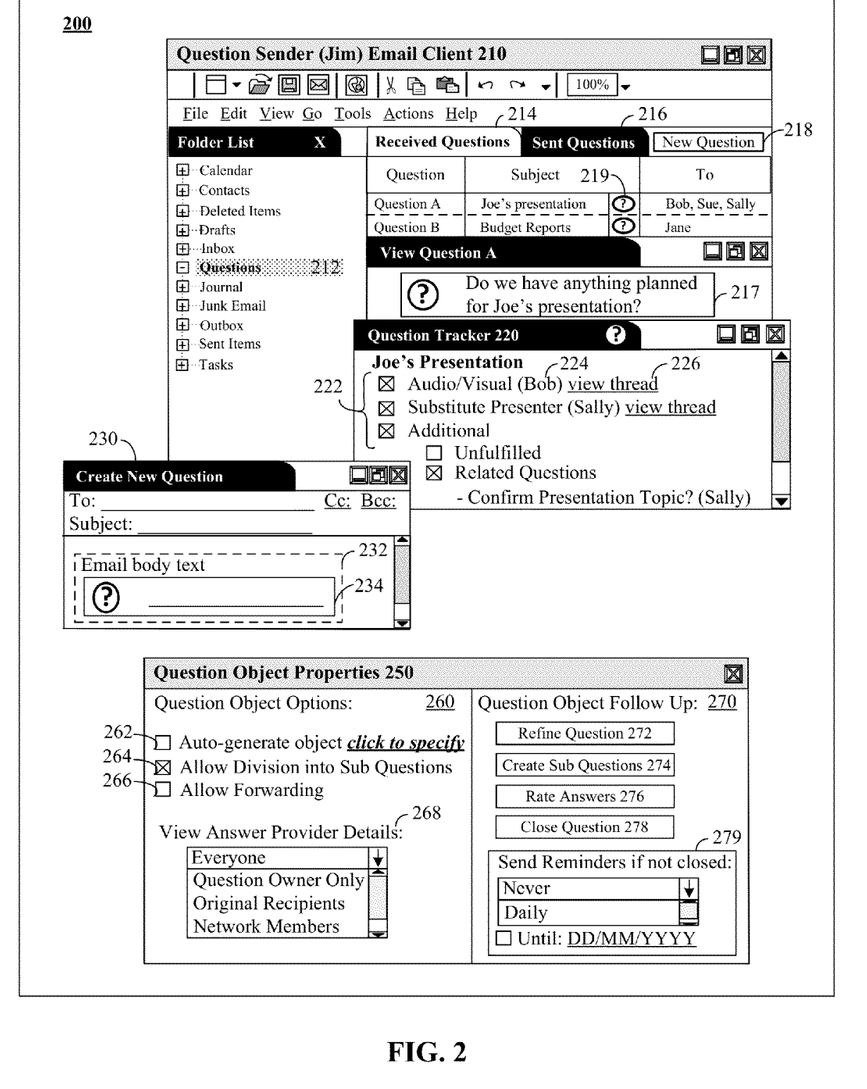
FIG. 2 shows a set of graphical user interfaces used by a question sender in accordance with embodiments of the inventive arrangements disclosed herein.

FIG. 2 shows a set 200 of graphical user interfaces 210, 230, 250 used by a question sender in accordance with embodiments of the inventive arrangements disclosed herein. It should be appreciated that any of a variety of user interfaces are possible and that the scope of the disclosure is not to be limited to specific interface elements and arrangements expressed herein. For example, assuming that an underlying document (e.g., document 160-170) expresses email content, email applicants can express this content in a myriad of manners. The ones shown in FIG. 2 are designed to emphasize that email question and answer tracking can cause client-side changes to an email interface. In other embodiments, minimalistic approaches can be taken, so that an end-user interface remains largely unchanged from a conventional interface. In other words, the user interface elements needed (and/or useful) for question tracking are variable and subject to design choices and user preferences.

In FIG. 2, question sender (Jim's) email client 210 can show aspects of an email client integrated solution for question object ownership and status tracking. Along with conventional folder options for an email client 210, a separate folder for Questions 212 can be applied to organize question object emails separately and easily accessible by the user. Emails with question objects can be quickly viewed rather than lost in a plethora of email communications in a user's inbox. Tab 214 can show received question object messages, while tab 216 can be dedicated to sent question object messages. That is, a new type of user interface or application "object" can be established for questions and related artifacts. Underlying document (e.g., document 160-170) can be mapped to these new objects.

In one embodiment, in the list of question object messages (received or sent), a question object tracker symbol 219 can be presented. Symbol 219 can provide an active link to the respective question's current question tracker 220 status. Question tracker 220 can display the summary status 222 of answers received for the respective question object. Additionally, information such as answer provider name 224 can be shown as well as a link to the thread confirming the answer provider's summary details.

Selecting the option for creating a new question 218 can launch a separate window 230, or alternatively a window in a specialized pane (preferences set by email client user) allowing a question sender (Jim) to compose an email message to be sent to recipients. The email message can include an email body text 232 as well as a question object 234.

Question sender (Jim) can access question object properties interface 250. Question object properties interface 250 includes settings to be manipulated by the question sender in generating question object(s) 217 and determining options for the respective question object(s) 217 associated with the email message. Question object options 260 can include, but are not limited to, auto generation of the object 262 settings, whether or not to allow division into sub questions 264, and whether or not forwarding to additional recipients 266 can be done from the recipient side.

Additional options can be, for example, options for controlling privacy similar to social networking sites. For example, options for recipients viewing answer provider details 268 in the question tracker 230 summary can include, but are not limited to, a set similar to the following options: every recipient can view answer provider identity and/or contact information, only the question owner can view the information, only original recipients and the answer provider, network members such as member of a work network can view answer provider identity, and the like.

Question object follow up options 270 can include, but are not limited to, the following options: a question sender can refine a question 272 after sending or partial answers have been received, create sub questions 274 based on the original question object 217, rate answer provider supplied answers 276, or close a question object 278 as completed. Additionally, question object follow up options 270 can allow settings such as reminders to be sent 279 if the question object has not been closed within a predetermined timeframe.

Figure 3:
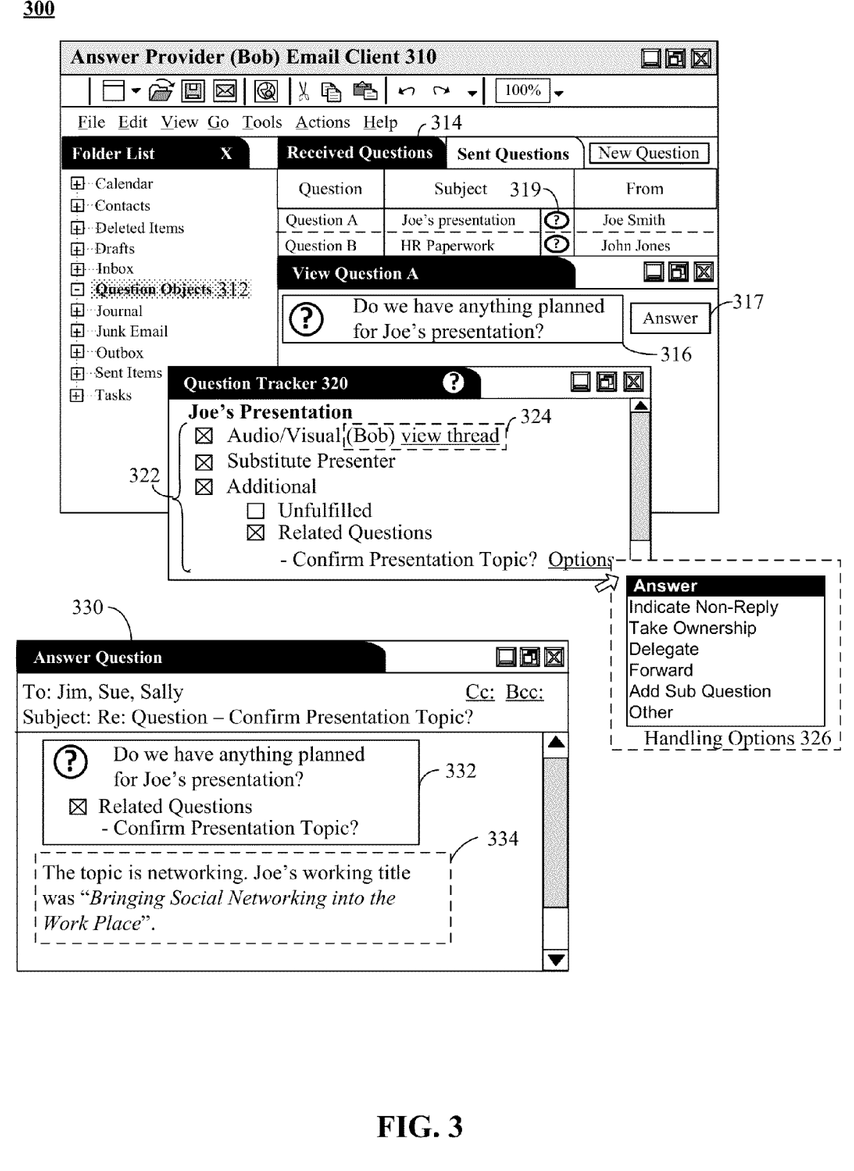
FIG. 3 shows a set of graphical user interfaces used by one or more question responders in accordance with embodiments of the inventive arrangements disclosed herein.

FIG. 3 shows a set 300 of graphical user interfaces 310, 320, 330 used by one or more question responders in accordance with embodiments of the inventive arrangements disclosed herein. Answer provider (Bob) email client 310 can include a separate folder or tab 312 for question objects 316. Received questions tab 314 can show question object message history and can when displayed include an initial answer link 317 (to be associated with a reply, reply all, etc. email message).

Upon user selection of answer link 317 for the initial question object 316 an answer question email can launch. Answer question email, in one embodiment, can be addressed to all original recipients and the question sender. However, it should be noted that all conventional email reply and forward options can be utilized unless specifically restricted by the question sender configuration of question object 316.

Additionally, answer provider email client 310 can allow for a question tracker symbol 319 to be shown for each respective message. User selection of the tracker symbol can launch question tracker 320 window. Question tracker 320 can present current question object status information 322 in compliance with privilege settings set by the question sender.

For example, answer provider details can be hidden from recipients. As shown, in one embodiment the user can view his or her own details/assumed responsibilities 324 with the associated email message thread. In another embodiment, the answer provider (Bob) can also view other answer provider's details and message threads depending on settings established by the question sender (as shown in FIG. 2).

Should status summary 322 include additional unfulfilled or related questions, an answer provider (Bob, Sue, Sally) utilizing his or her email client can select a variety of handling options 326 for such a sub question or unfulfilled/related question. Handling options can be, but are not limited to, the following: answer, indicate non-reply (specifically decline to answer), take ownership (return with an answer at a later time), delegate (a task or research associated with the question object), forward (if question sender options permit), add a sub question (if settings permit), and other options.

For example, should answer provider (Bob) select to answer a related question, answer question email window 330 can launch. The email 330 can be composed of a related question object 332 and email body text containing the answer 334 to the question 332 itself. Answer 334 can, in another embodiment, be a specialized answer object rather than being presented/provided in email text body form. The object can be, but need not be, embedded.

Figure 4:
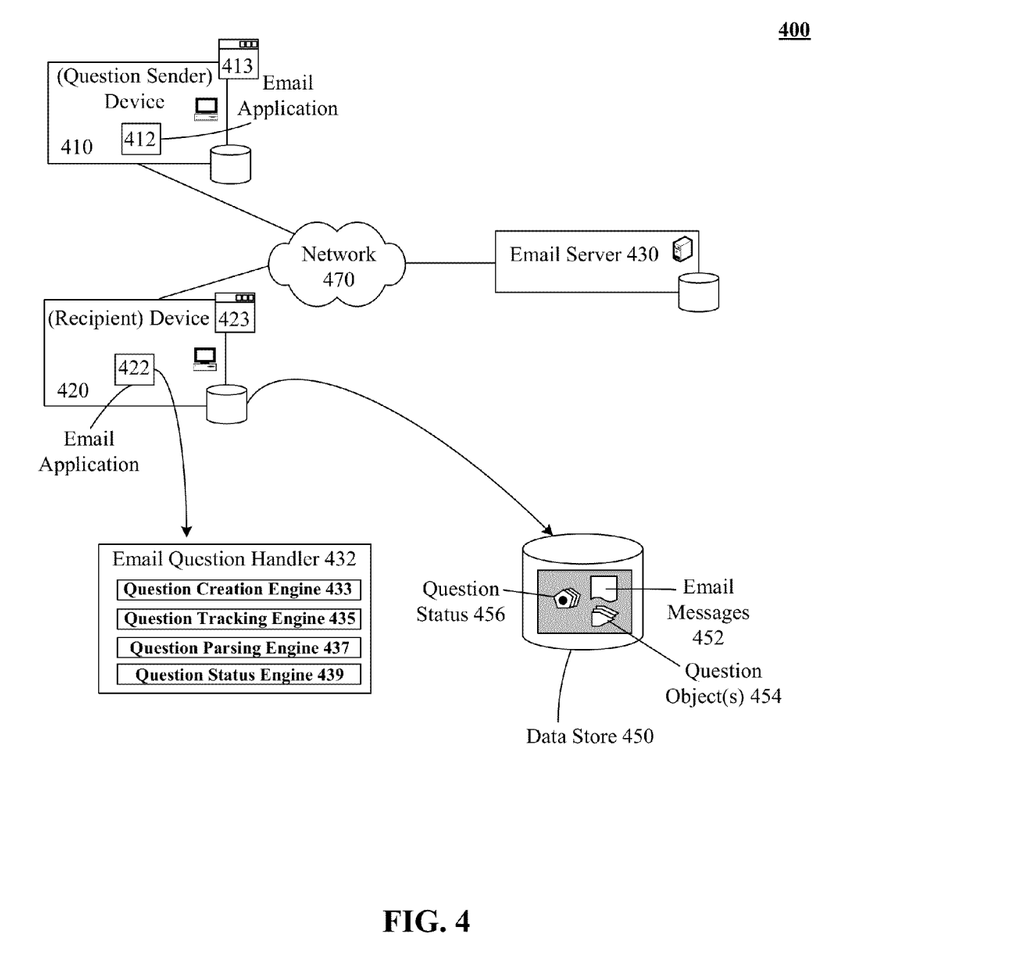
FIG. 4 is a schematic diagram illustrating a system for handing email questions in accordance with an embodiment of the disclosure.

FIG. 4 is a schematic diagram illustrating a system 400 for handing email questions in accordance with an embodiment of the disclosure. The system 400 can include at least one sending device 410 that utilizes an email server 430 to send email messages to one or more recipient devices 422. The devices 410 and 420 can include client-side email applications 412 and 422, which communicate with the email server 430 over network 470. Human users can interact with the email applications 412, 422 via a user interface 413 and 423.

The email server 430 can include "standard" functions to facilitate exchanges of email messages 452. That is, email server 430 can include hardware and software that transfers email messages 452 from one device 410 to another 420 using a client-server architecture. Email server 430 can support numerous protocols, such as Simple Mail transfer Protocol. Stated differently, the email server 430 can provide internet message handling services (MHS). In one embodiment, a domain name system (DNS) can associate the email server 430 to a domain with mail exchanger (MX) resource records containing the domain name of a host providing the mail transfer agent (MTA) services. Email server 430 can store email messages in a data store 450.

In system 400, one or more computing devices (e.g., 410, 420, 430, or a server of network 470, such as a middleware server) can include email question handler 432 software. This software 432 can store information in a data store (e.g., data store 450). The data store 450 stores a set of question objects 454 as well as a question status 465. Each question object 454 can represent a unique object assigned to a question, where question answers, and other information specific to questions are indexed against these question objects 454. The email question handler 432 can provide functions for the question objects 454 and question status 456 objects. More specifically, the question handler 432 can include a question creation engine 433, a question tracking engine 435, a question parsing engine 437, a question status engine 439, and/or the like.

The question creation engine 433 can allow email users to create a question object 454 to be sent to recipients in an email message. In one embodiment, the question creation engine can assign a unique tracking identifier to each question object 454.

The question tracking engine 435 can track actions related to a question (or a question object 454).

The question parsing engine 437 can be utilized to identity and extract questions and answers to questions from text of a body of an email message 452. For example, the email question handler 432 can be designed to interoperate with specialized email applications that have been enhanced to add email question and answer capabilities (e.g., they possess specialized objects related to the question objects 454 and/or question status 456). The handler 432 can also work with legacy (unmodified) client-side email applications 412 and/or 422. In such a situation, the parsing engine 437 can automatically determine portions of email messages that represent a question and other portions that represent answers. These potions can be parsed or extracted, and relative question objects 454, question status 456, and other question related data can be updated appropriately.

The question status engine 439 can update the status of the question object 439 when email responses are received at the email server 430. For example, the status engine 439 can indicate whether or not questions (associated with one or more question objects 454) have been completed, canceled, or are pending. The status engine 439 can also indicate a responsibility status of a question. That is, different ones of the recipients (or other users designated by the original recipients) can accept (or explicitly refute) responsibility for answering one or more questions. Various datum elements (response due date/time), response source, etc. can be maintained as well within the data store 450.

In one embodiment, question objects 454 can be nested with each other. That is, a question object 454 can include a set of zero or more other question objects 454, which represent sub-questions, each of which can be separately tracked, can have its own status, etc.

In one embodiment, the question handling function (question handler 432) can be implemented by client side devices (e.g., device 410 and/or 420). In another embodiment, the question handler 432 can be implemented within the email server 430. In still another embodiment, the question handler 432 function can be provided by a server connected to the network 470 that is distinct form the clients 410, 420 or email server 430. For example, a Web service server can provide question handling functions as detailed herein as a software service. In one embodiment, a question handling functionality can be provided by one or more servers of a middleware platform (e.g., a J2EE server, a WEBSPHERE server, etc.)

As shown herein, each client device 410, 420, and/or server 430 can comprise a set of one or more hardware devices, each of which optionally containing software (e.g., an operating system, BIOS, software/firmware computer program products, etc.) that the hardware is able to execute to perform computing operations. The hardware can include one or more central processing unit, a volatile memory, and a nonvolatile memory, and a network adaptor (for connecting the hardware to a network) interconnected via a bus. Each of the device and server can be implemented as a standalone machine or as a set of two or more machines operating in a distributed computing space as a single computing device. Further, a software application, as detailed herein, can be an application comprising multiple different components, each of which may be executed upon different servers or client-side devices.

Network 470 can include any hardware/software/and firmware necessary to convey data encoded within carrier waves. Data can be contained within analog or digital signals and conveyed though data or voice channels. The network 470 can include local components and data pathways necessary for communications to be exchanged among computing device components and between integrated device components and peripheral devices. The network 470 can also include network equipment, such as routers, data lines, hubs, and intermediary servers which together form a data network, such as the Internet. The network 470 can also include circuit-based communication components and mobile communication components, such as telephony switches, modems, cellular communication towers, and the like. The network 470 can include line based and/or wireless communication pathways.

Each computing device 410, 420, and/or server 430 of system 400 can be associated with one or more data stores, such as data store 450. Each of these data stores can be a physical or virtual storage space configured to store digital information. Data stores can be physically implemented within any type of hardware including, but not limited to, a magnetic disk, an optical disk, a semiconductor memory, a digitally encoded plastic memory, a holographic memory, or any other recording medium. Data stores can be a stand-alone storage unit as well as a storage unit formed from a plurality of physical devices. Additionally, information can be stored within data stores in a variety of manners. For example, information can be stored within a database structure or can be stored within one or more files of a file storage system, where each file may or may not be indexed for information searching purposes. Further, data stores can utilize one or more encryption mechanisms to protect stored information from unauthorized access.

Figure 5:
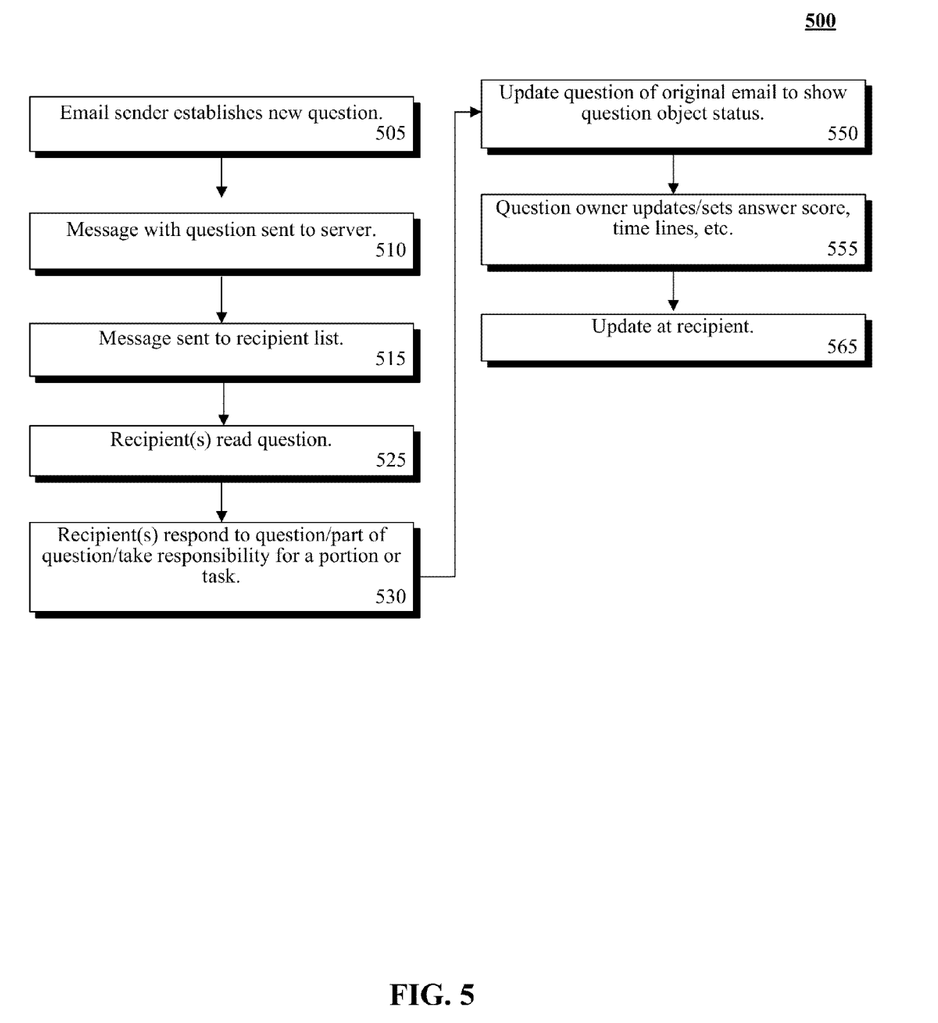
FIG. 5 is a flow chart of a method for generating and tracking status of email questions in accordance with embodiments of the inventive arrangements disclosed herein.

FIG. 5 is a flow chart of a method for generating and tracking status of email questions in accordance with embodiments of the inventive arrangements disclosed herein.

In step 505, the email sender can establish a new question. In step 510, an email message with the new question is sent to the server. Subsequently, in step 515, the message is sent to the recipient list. The recipient list can be designated by the original question sender/asker.

In step 525, the recipient(s) read the question contained in the email message. Subsequently, in step 530, one or more recipients can respond to the question posed. The response can be to the whole question, part of the question, or be in the form of taking responsibility for or ownership of a portion or a task associated with the question, and the like.

In step 550, the question of the original email message is updated to reflect the current status, at email clients of each of the recipients and the sender. In response, in step 555, the question owner can set an additional answer score, dictate time lines, request additional answers to the whole question or sub questions/parts of the whole question posed in the original email. The question owner can optionally also refine the originally posed question, via one or more clarifications.

Then, in step 565, the email message with the question object is updated and/or closed at the recipient's email client(s). This can optionally allow the process to return to step 525, during which the one or more recipient(s) can read the question object or question object status. The recipient(s) can, at this stage, also elect to supply further information (give another answer or respond to a different part of the question previously not responded to) if requested by the question owner and as long as the question object has not been closed by the question sender.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   establishing one or more questions within an email message from a sender to a set of recipients;
   assigning a unique question identifier to each of the one or more questions within metadata of the email message;
   indicating a question owner for each of the one or more questions within metadata of the email message;
   conveying the email message to the set of recipients;
   receiving an explicit answer to at least a portion of the one or more questions from an answer provider, wherein the answer provider is one of the recipients;
   associating the explicit answer with the corresponding one of the questions within metadata of the email message;
   indicating the answer provider within metadata of the email message; and
   automatically modifying the email message to present the explicit answer and the answer provider within the email message, wherein the email message containing the one or more questions is continuously updated at computing devices of the sender and the set of recipients to reflect a current status of the one or more questions, wherein user interfaces of each of the set of recipients is provided at least three options, said at least three options comprising options (i) to indicate ownership of each of the one or more questions, (ii) to answer each of the one or more questions, and (iii) to explicitly indicate non-ownership of each of the one or more questions and wherein the set of recipients are prompted to select one of the at least three options.

2. The method of claim 1, wherein the email message is represented within a markup document, which is conveyed between the sender and the set of recipients, wherein the markup document comprises explicit tags reserved for designating each of the one or more questions, for designating a question owner, for designating answers to the one or more questions, and for designating indications of ownership of responsibility for answering the one or more questions by specific ones of the set of recipients.

3. The method of claim 1, wherein the email message is represented within a markup document, having a tag designating a section for a body of the email message, wherein at least one additional tag within the body is continuously updated and added to the markup document to reflect the current status of the one or more questions, in accordance with recipient responses or sender changes.

4. The method of claim 1, wherein the question owner establishes when any of the one or more questions are closed, at which point further answers to the closed one of the questions are not accepted.

5. The method of claim 1, wherein each of the one or more questions is input into a specialized object of an email client, which is specially handled as a question type of object and is not handled as standard content of a body of the email message.

6. The method of claim 1, wherein the question owner is not the same person as the sender of the email message.

7. The method of claim 1, wherein the set of recipients of the email message are permitted to accept responsibility to answer the one or more questions without providing an answer, such as for situations when the one or more questions cannot be answered immediately but require a span of time to respond, wherein the acceptance of responsibility is tracked and shown to the email owner.

8. The method of claim 1, wherein the explicit answer is in a thread to the email message, as well as a special area of the email message shown when the email message is presented by the sender or any of the set of recipients.

9. The method of claim 1, wherein the one or more questions are not generic text of an email body but rather a unique decomposable object of an email client.

10. The method of claim 1, further comprising: dynamically updating a body of a copy of the email message as originally sent by the sender and received by the set of recipients to show the explicit answer.

11. A system comprising:
    one or more processors;
    one or more non-transitory storage mediums, which store program instructions executable by said one or more processors, said one or more processors executing the program instructions causing the system to:
    establish one or more questions within an email message from a sender to a set of recipients;
    assign a unique question identifier to each of the one or more questions within metadata of the email message;
    indicate a question owner for each of the one or more questions within metadata of the email message;
    convey the email message to the set of recipients;
    receive an explicit answer to at least a portion of the one or more questions from an answer provider, wherein the answer provider is one of the recipients;
    associate the explicit answer with the corresponding one of the questions within metadata of the email message;
    indicate the answer provider within metadata of the email message; and
    automatically modify the email message to present the explicit answer and the answer provider within the email message, wherein the email message containing the one or more questions is continuously updated at computing devices of the sender and the set of recipients to reflect a current status of the one or more questions, wherein user interfaces of each of the set of recipients is provided at least three options, said at least three options comprising options (i) to indicate ownership of each of the one or more questions, (ii) to answer each of the one or more questions, and (iii) to explicitly indicate non-ownership of each of the one or more questions and wherein the set of recipients are prompted to select one of the at least three options.

12. The system of claim 11, wherein the program instructions are instructions of a client-side email application.

13. A computer program product comprising a non-transitory computer readable storage medium having computer usable program code embodied therewith, the computer usable program code comprising:
    computer usable program code stored in a non-transitory storage medium, executed by a processor to establish one or more questions within an email message from a sender to a set of recipients;
    computer usable program code stored in a non-transitory storage medium executed by a processor to assign a unique question identifier to each of the one or more questions within metadata of the email message;

computer usable program code stored in a non-transitory storage medium, executed by a processor to indicate a question owner for each of the one or more questions within metadata of the email message;

computer usable program code stored in a non-transitory storage medium, executed by a processor to convey the email message to the set of recipients;

computer usable program code stored in a non-transitory storage medium, executed by a processor to receive an explicit answer to at least a portion of the one or more questions from an answer provider, wherein the answer provider is one of the recipients;

computer usable program code stored in a non-transitory storage medium, executed by a processor it is operable to associate the explicit answer with the corresponding one of the questions within metadata of the email message;

computer usable program code stored in a non-transitory storage medium executed by a processor to indicate the answer provider within metadata of the email message; and computer usable program code stored in a non-transitory storage medium, executed by a processor to automatically modify the email message to present the explicit answer and the answer provider within the email message, wherein the email message containing the one or more questions is continuously updated at computing devices of the sender and the set of recipients to reflect a current status of the one or more questions, wherein user interfaces of each of the set of recipients is provided at least three options, said at least three options comprising options (i) to indicate ownership of each of the one or more questions, (ii) to answer each of the one or more questions, and (iii) to explicitly indicate non-ownership of each of the one or more questions and wherein the set of recipients are prompted to select one of the at least three options.

14. The computer program product of claim 13, wherein the email message is represented within a markup document, which is conveyed between the sender and the set of recipients, wherein the markup document comprises explicit tags reserved for designating each of the one or more questions, for designating a question owner, for designating answers to the one or more questions, and for designating indications of ownership of responsibility for answering the one or more questions by specific ones of the set of recipients.

15. The computer program product of claim 13, wherein the email message is represented within a markup document, having a tag designating a section for a body of the email message, wherein additional tags within the body are continuously updated and added to the markup document to reflect the current status of the one or more questions, in accordance with recipient responses or sender changes.

16. The computer program product of claim 13, wherein each of the one or more questions is input into a specialized object of an email client, which is specially handled as a question type of object and is not handled as standard content of a body of the email message.

* * * * *